US006934846B2

(12) United States Patent
Szrek et al.

(10) Patent No.: US 6,934,846 B2
(45) Date of Patent: Aug. 23, 2005

(54) METHOD OF GENERATING UNPREDICTABLE AND AUDITABLE RANDOM NUMBERS

(76) Inventors: Walter Szrek, 60 Spencer Ave., East Greenwich, RI (US) 02818; Irena Szrek, 60 Spencer Ave., East Greenwich, RI (US) 02818

(*) Notice: Subject to any disclaimer, the term of this patent is extended or adjusted under 35 U.S.C. 154(b) by 182 days.

(21) Appl. No.: 10/248,471

(22) Filed: Jan. 22, 2003

(65) Prior Publication Data
US 2004/0141611 A1 Jul. 22, 2004

(51) Int. Cl.[7] .............................................. H04L 9/22
(52) U.S. Cl. .................... 713/180; 380/251; 380/262
(58) Field of Search ................ 713/180; 380/251, 380/262; 463/29

(56) References Cited

U.S. PATENT DOCUMENTS

| 5,643,086 | A | * | 7/1997 | Alcorn et al. ............... 463/29 |
| 5,778,069 | A | * | 7/1998 | Thomlinson et al. ........ 380/262 |
| 5,871,398 | A | * | 2/1999 | Schneier et al. ............. 463/16 |
| 6,595,855 | B2 | * | 7/2003 | Sako .......................... 463/29 |
| 6,659,861 | B1 | * | 12/2003 | Faris et al. .................... 463/1 |
| 6,685,562 | B1 | * | 2/2004 | Rantanen .................... 463/17 |
| 2001/0038178 | A1 | * | 11/2001 | Vancura ..................... 273/274 |
| 2002/0141590 | A1 | * | 10/2002 | Montgomery ............... 380/277 |
| 2002/0161721 | A1 | * | 10/2002 | Yuan et al. .................. 705/65 |

* cited by examiner

*Primary Examiner*—Gregory Morse
*Assistant Examiner*—Andrew L Nalven
(74) *Attorney, Agent, or Firm*—Barlow, Josephs & Holmes, Ltd.

(57) ABSTRACT

A system and method for generation of unpredictable and auditable random numbers includes a host computer, a digital signature server and a verification device. The host computer provides data to the digital signature server; obtains digital signature for this data; uses elements of this signature for random numbers generation; logs relevant data for audit. The verification device uses logged data for auditing of the random number generation process. This invention can be applied in gaming and gambling industries where the random numbers are used for generation of game/play elements and of winning numbers elements. The game/play elements and winning numbers elements generated using this invention can be audited.

59 Claims, 5 Drawing Sheets

METHOD OF GENERATING UNPREDICTABLE AND AUDITABLE RANDOM NUMBERS

BACKGROUND OF THE INVENTION

The present invention relates generally to the generation of random numbers in the gaming and gambling industry. More specifically, the present invention relates to generating random numbers that are auditable in a secure environment.

It is well known in the gaming and gambling industry that random numbers are used to generate winning numbers for games of chance, e.g. for keno or lotto games, and the like. Another use in gaming industry is to generate plays for instant games of chance that are provided on-line, such as via the Internet.

In such gaming machines and in online casinos, as is well known in the prior art, random numbers are used to generate game outcomes and events. For example, an instant game is a game, in which winning status is determined immediately when the game is played. In contrast, a draw based game, such as lotto, keno, or numbers game, winning combinations are drawn at a later time, such as after all of the players have finished placing bets. When all bets have been taken, a drawing of winning outcomes is held. Some of the games may be a combination of instant games and draw based games.

In the gaming or gambling environment, random numbers could be used in different ways. For example, the game provider may have a pool of possible play outcomes and random number element may be used to choose the play from this pool. Alternatively, the random number element of such a game may be used to choose a play directly. For example, if a random number is evenly distributed in the range of [0, 1], then the game should distribute a specific play outcome for 25% of plays. One can choose this play when a random number is less or equal 0.25 where the random number element could be used for some transformation to determine the play outcome. The same methodology may be used for computerized drawing of the cards in unpredictable and auditable way, for computerized throwing of the dice in unpredictable and auditable way, for drawing of winning numbers for games of chance, such as lotto and for generation of instant games, plays, and the like. Moreover, all of these games may be played or data provided in different ways. These methods include casino slot machines, similar casino machines, video lottery, on-line lottery. As can be understood different types of end-user access devices may be employed to interface with the game. In that connection, specialized machines such as lottery terminals, video lottery machines, slot machines or other type of devices for use in the video lottery and casino slot and non-slot machines may be used. It can also be used in the computerized games of skills, where certain features are activated with certain probability and audit of such games is necessary. In addition there are some other applications where the result is normally determined by some event such as horse race, game score, etc. In some instances, these events are cancelled or are postponed and the "result" is randomly chosen by some kind of drawing.

Game play data and/or winning data are very sensitive, particularly if they involve online gaming where money is transacted. As a result, the use of such data requires that high level of integrity and security be employed. Players and game providers require the assurance that the numbers generated are truly random and non-predictable to ensure the integrity of the game. As can be understood, results generated in game where the outcome is already known or could be manipulated by an insider, such as a member of game providers staff, cannot be accepted by both provider and players. In such a case, the integrity of the game is threatened if not completely destroyed.

Currently, there are different methods of generation of random numbers used in gaming and gambling industry. One method is "true" random number generation which is a method that lacks a means of verification. Also, there is "pseudo" random number generation which is implemented via specialized algorithms and which can be verified but numbers are predictable.

Random numbers are used to generate various game elements, including play data for the games, which is also known as winning data. Data may be stored in computer and retrieved via specialized algorithms, or generated "on-the-fly". Proper audit capability is required to ensure that this process has not been circumvented. Any type of tampering of data or data generation software is a serious danger for the game provider because the players may stop playing if they see that the game lacks the necessary integrity.

Unpredictable random number generation and audit capability are not easily solved together. Traditionally, methods for the generation of random numbers either provide somewhat predictable outcomes or do not allow for auditing of the outcomes. In addition, traditional methods provide limited built-in protection against abuse where security of the process is based mainly on the physical security, statistical analysis and extensive software reviews. As a result, the traditional approach may be susceptible to insider fraud as there is no way to audit actual data.

In view of the foregoing, there is a demand for a method of generating random numbers that are truly random. There is also a demand for a method of generating random numbers that are not predictable. Further, there is demand for such a method to be secure and impervious to fraud. There is a demand for a method of generating numbers that preserves the integrity of the game.

SUMMARY OF INVENTION

The present invention preserves the advantages of prior art methods for generating random numbers. In addition, the improved method of the present invention provides new advantages not found in currently known methods and overcomes many disadvantages of such currently available methods for generating random numbers and devices associated therewith.

The invention is generally directed to the novel and unique method of generating random numbers. The method of generation and auditing of random numbers of the present invention ensures that the numbers are both unpredictable and auditable. The method detects any insider fraud, even if the insider has access to all data and all algorithms used.

In accordance with the present invention, a digital signature server is employed to provide a data source for random number generation while being fully auditable using a public key. Use of a digital signature server for the generating of random numbers will be described in detail below.

Various digital signature "independent" server devices are known which can be used to sign user provided data. By independent server in this context, it is meant that the data provider for the server does not know and does not have an access to the signer's secret private key. These devices are tamper proof or tamper evident and sign user provided data without revealing its private key. The private key is kept in a way that there is no possibility to retrieve it. Any interested party can verify the data signed by such digital signature server. This verification detects if data was tampered with by recreating the signed data and checking the signature using a published public key.

This invention uses the properties of digital signatures in that one can verify the signature without knowing the signing private key but with the knowledge of "published" public key. Also, one cannot create a valid signature without knowing a private key. Another important feature of digital signatures is that the digital signature is not predictable. Since the signature is not predictable, it can be used as the element for generation of random numbers.

One needs also to recognize performance aspects of currently available digital signature technology. Signing and signature verification are relatively slow processes. The speed is related to the length of the cryptographic keys, which determines the strength of the signature, i.e. how quickly a signature could be broken. In some situations, such as generation of game elements, where performance is critical, it may be advantageous to use short cryptographic keys with a limited time of usage. Various techniques can be used to extend audit ability of data signed with short keys.

Game elements are created using the elements of the random number. To create game elements a verifiable transformation is used. Different elements, which may be referred to as source data elements, may be used for this transformation. Such source data elements may be obtained from a pool of possible game element outcomes, other game data, access device identifier data, player identifier data, a custom algorithm generating a game element outcome, and other like sources. Client Application logs the digital signature, signature input elements and game element outcome for later verification. By verifying the signature and repeating the steps of recreating random number and game elements and by comparing them with the data elements logged, the actual game elements are verified/audited.

Accordingly, it is a primary object of the instant invention to provide an improved method of generating random numbers.

Another object of the instant invention is to provide a method of generating truly random numbers.

Still further, an object of the instant invention is to provide a method generating random numbers that are not predictable.

It is yet another object of the present invention to provide a method of generating random numbers that is auditable.

A further object of the present invention is to provide a method of generating random numbers that is impervious to fraud.

Another object of the present invention is to provide method of generating random numbers that preserves the integrity of the game.

Another object of this invention is the technique of using short cryptographic keys in purpose to enhance performance.

BRIEF DESCRIPTION OF DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION

Figure 1:
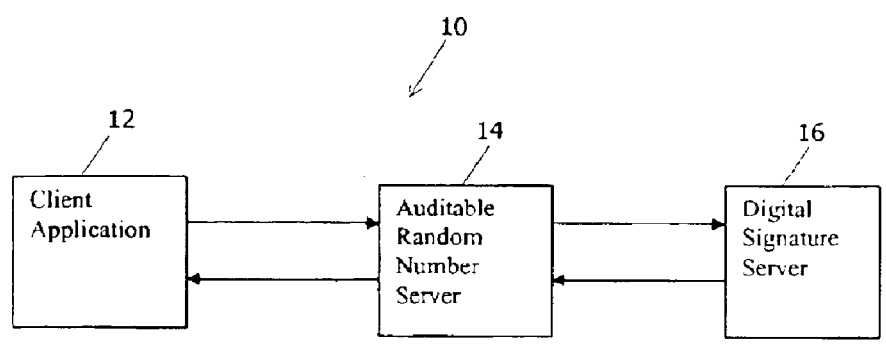
FIG. 1 is a diagrammatic view of the logical process of generating an unpredictable and auditable random number according to the present invention.

Referring first to FIG. 1, a diagrammatic view of the logical process 10 of generating unpredictable and auditable random numbers, namely logical entities, is shown in accordance with the present invention.

The client application 12 requests an unpredictable and auditable random number and may also provide input data elements to base the generation of the random number itself. The auditable random number server 14 prepares the input data elements for signing and generation of the random number. Also provided is a digital signature server 16, which is preferably a Public Key Infrastructure (PKIX) "standard" digital signature server. A PKIX time stamp server or other similar devices can be used as the digital signature server 16. The digital signature server 16 must be able to ensure the generation of unique, unpredictable and verifiable signatures. The digital signature server 16 has a private (secret) key which is used for the signing of the data and for the publication of the public key. The public key may be used by other entities to verify the digital signature.

Figure 2:
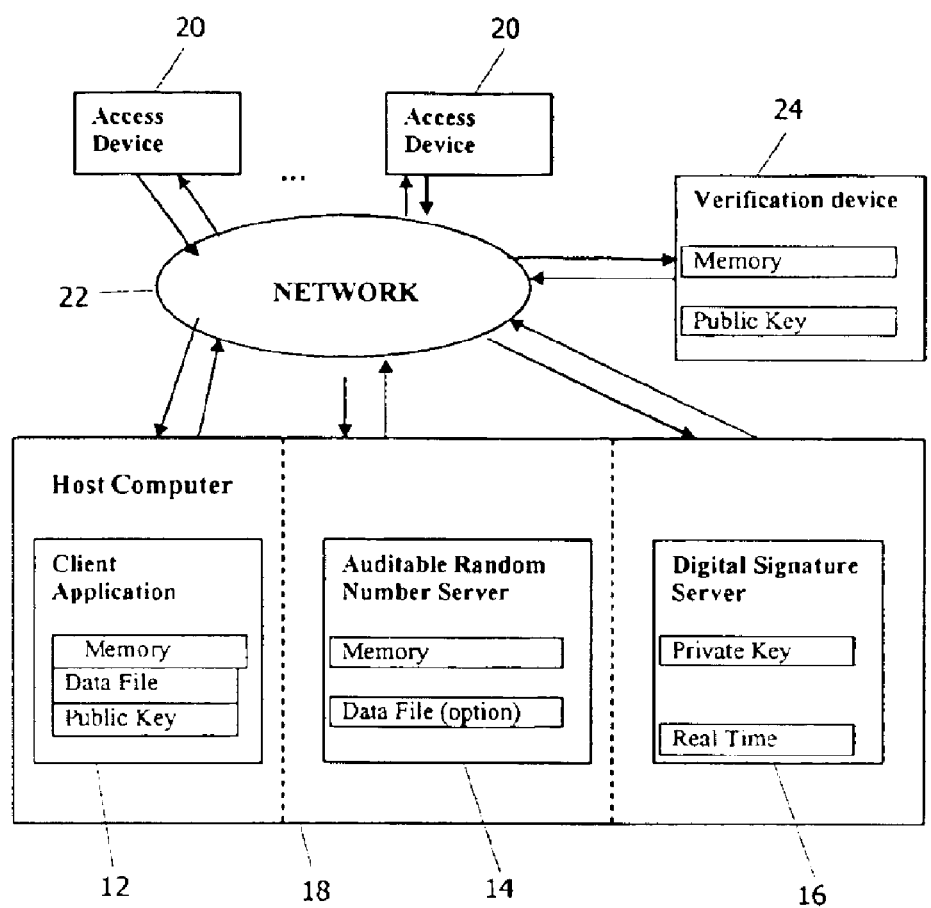
FIG. 2 is a diagrammatic view of a system for carrying out the method according to the present invention.

Turning now to FIG. 2, a diagrammatic view of the system for carrying out the method 10 of the present invention is shown. In particular, the physical entities are illustrated in detail in FIG. 2.

The host computer 18 contains the client application 12, an auditable random number server 14 and a digital signature server 16. By way of example, the client application 12 is shown in FIG. 2 to reside on one host computer 18; however, is it possible that the client application 12 may reside on multiple host computers 18 and still be within the scope of the present invention. The host computer 18 is capable of storing the information in one or more data files such as flat file, database, and the like. These data files may reside on the host computer 18 or some other physical device or devices.

The client application 12 may store in its memory various data elements required to provide input data for random number generation. In some embodiments of the present invention, the client application may verify origination of the digital signature of data with signer's public key, stored internally in its memory. The client application 12 communicates with the auditable random number server 14, as will be described below.

The auditable random number server 14 may reside on one or more host computers 18 or it may reside on one or more separate devices. The auditable random number server 18 communicates with one or more client applications 12. In some instances it may be integrated with a client application 12. In some embodiments, this layer may be not present. In this case, the client application 12 will provide the same functionality. The auditable random number server 14 must be able to communicate with digital signature server 16. The auditable random number server 14 may optionally log information in data files. For some embodiments, it may need to have memory to store data elements such as a request counter that are preserved between multiple random number generation requests.

Also provided within the host computer 18 is a digital signature server 16 which consists of one or more distinct hardware devices. It is a secure, tamper proof device which may be in different forms and configurations. For example, it may be in the form of a "plug-in" board on the host computer 18 or auditable random number server 14; or a smart card, coprocessor board or separate board in the host computer 18 or auditable random number server 14. It may also reside in an independent server on a network or a combination of more than one different devices, etc.

The digital signature server 16 utilizes a private key to generate a digital data signature. It may optionally contain, or be able to communicate with, a real time clock for time stamping purposes. For example, a PKIX time stamp server may be used which is a server with a real time clock. Each time a signature is generated, a current time is also signed. This ensures that at different times the digital signature is never the same, even if the same data is provided to be signed. Not only is the data unpredictable and auditable but the time the document was signed is also auditable. This also ensures that no party can ever recreate this signature. There are tamper proof or tamper evident servers available that prevent tampering with the time by not allowing the time moved back or by obtaining the time from external trusted sources and by keeping their private key inaccessible. A similar effect of enforcing different signatures can be achieved if the tamper proof digital signature server 16 was to add any type of varying and signed element, such as a counter, a random number, or even a previous signature.

The system of FIG. 2 includes an access device 20 to access the network 22 connected to the host computer 18. This access device 20 may be in the form of an operator console, a lottery terminal, a video terminal, a slot machine, any type of casino machine, personal digital assistant (PDA), a mobile phone, land-based phones, and Internet enabled devices such as a PC, WebTV, and "Intelligent TV", devices, and the like. In general, the access device 20 must be able to communicate directly or indirectly with the host computer 18. In some embodiments, it may be desirable to integrate the access device 20 directly with the host computer 12.

The verification device 24 is an independent computer system, with its own memory. It stores a public key for digital signature verification capability. This system may receive information in real time or in batch form. Information may be provided over the network 22 or in the form of storage media such as tape, disk, etc. This verification device 24 does not need to be connected to the network 22 if data is received in form of the storage media. This does not have to be a completely separate device as shown in FIG. 2. This functionality of verification may be provided by an already existing device serving other application audit needs.

The network 22 is any private or public network, or a combination of the various types of networks, such as LAN, Internet, VPN (Virtual Private Network), traditional phone network, Mobile network, cellular network, GPRS, X.25 network, leased lines network, IP network, Satellite network, cable network, and the like.

Figure 3:
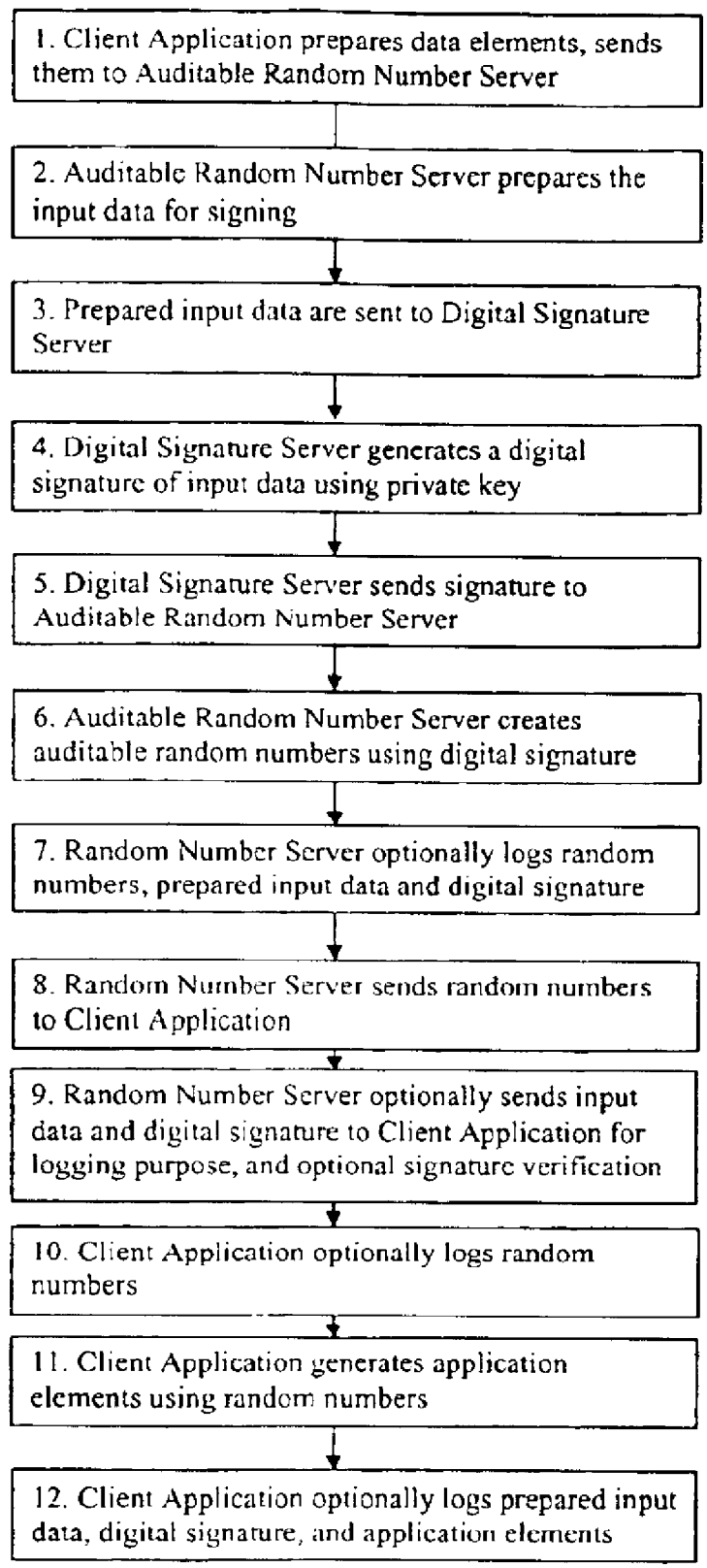
FIG. 3 is a flowchart showing the process of generating game elements according to the present invention.

Referring now to FIG. 3, the method of generating random numbers in accordance with the present invention is shown and described in detail. First, the client application 12 prepares input data and requests a random number from the auditable random number server 14. In some embodiments, the methods may request more than one random numbers for the application at hand. Input data is preferably defined in such a way that it cannot be manipulated by an insider.

During the data preparation, a one way hash function is preferred to transform input data. One way hash is a special mathematical function, such as MD5, SHA1 that transforms a string of data into a unique string of bits. If any data element is changed the resultant one way hash of this data will also change. In some embodiments input data could be of 0 length (null).

The input data can be in the form of many different types and still be within the scope of the present invention. For example, the input data may be fixed data, such as a constant data string. Alternatively, the input data may be variable data that can be verified and be applied to check if random number was used for its intended use. For example, in a gaming environment, data elements such as a transaction identifier; a player identifier; a device identifier; and game and draw identifier elements could be used as a variable data.

The auditable random number server 14 optionally transforms input data. In some embodiments of this invention auditable random number server 14 may sign the data before it is sent to digital signature server 16 or perform other hash operations of data input elements. In some embodiments of the invention, this step may be executed by the client application 12. Input data can be additionally combined with any of the following data elements: (1) "raw" or transformed "raw" input data elements; (2) previously generated random number elements or previously received digital signature elements; (3) internal count of random number requests of auditable random number server 14; (4) any type of verifiable data; (5) "random" data; and (6) any combination of the foregoing types.

Once the input data is prepared, it is passed to the digital signature server 16. The digital signature server 16 generates an input data digital signature using a private key. In the preferred embodiment, the digital signature server 16 adds its own identifier, known as a signature sequence number, which is constructed in such a way that all issued signatures are accounted for. This could be an element such as: (1) the total number of signatures issues; (2) an algorithmically increasing number; or (3) an internal counter that could be queried and signed separately.

A PKIX time stamp server is preferred which inserts a time stamp and signs the prepared input data, the signature sequence and the time. In other embodiments of this invention, a standard digital signature server 16 is used. In some other embodiments an encryption device using asymmetric keys is used. It should be understood that data encrypted with the private key is treated herein as a "signature".

Once the digital signature is created, the digital signature server 16 passes the digital signature to the auditable random number server 14 which, in turn, uses the digital signature as an element for the generation of one or more random numbers. In accordance with the present invention, the digital signature can be used in two ways. First, it may be used directly where all or part of the digital signature string is used or indirectly where all or part of the digital signature is used after some form of data scrambling, such as symmetric or asymmetric encryption or some other algorithmic method, done in such a way that the auditing process can repeat or execute the data transformation process and verify the results. For transformation, the verification system must know the transformation mechanism or scheme.

The input data, the prepared input data, the digital signature, and the random numbers are preferably logged by the auditable random number server 14. However, such logging is optional. Random numbers are passed by auditable random number server 14 to the client application 12. In certain situations, this step may be executed multiple times from a single digital signature signing.

Also, the input data, the prepared input data and the digital signature may also be passed to the client application 12 for logging. This step of logging by the client application 12 is optional. Further, the client application 12 preferably verifies the digital signature but this step is also optional. Moreover, the random numbers are optionally logged by the client application 12.

Thus, the use of random numbers by the client application generates application elements. In gaming environment, for example, these application elements are game elements such as winning draw data, play information, card draw, slot machine play, dice throw, instant Internet transaction data and information how to position wheels in a slot machine, and the like. The input data, the prepared input data, the digital signature and the application elements created are optionally logged by the client application 12.

Figure 4:
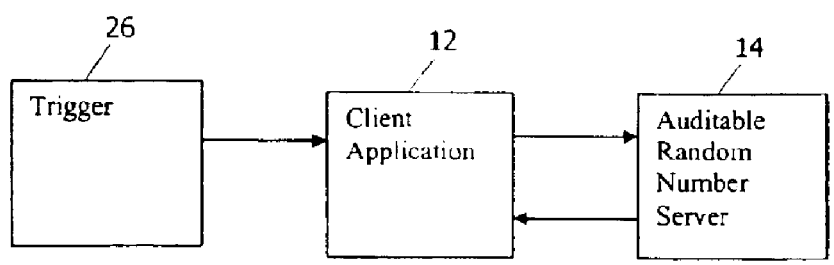
FIG. 4 is a diagrammatic view of application schema.

The generation of game elements following the occurrence of a sequence of events is shown in FIG. 4. A trigger 26, either internal or external, requests generation of a game element. The trigger 26 can be invoked by a timer, manual action, or as a result of the logical sequence of the game progress. This can be an event such as operator's request to generate a draw number, timer request to generate a draw number, player play/bet request entry, player action activating the slot machine, gaming terminal operator requesting an instant game wager, and the like.

The trigger 26 is then "forwarded" to the client application 12. The input for random number generation is prepared. The input is preferably provided in form of a hash value of different data elements but may be in different formats. These could be elements of the game information, game provider information, constants, player information, time, access device information, some historical activity information such as elements of hash of previous activity, of previously generated game elements, digital signatures or other data. In the preferred embodiment data, elements identifying the play, such as game information elements, draw number elements, player information elements and the like are used in the data input. This allows for further verification that the random numbers were used for the correct game/play. One of the methods of initiation of the random number server is a number of random numbers requested.

The auditable random number server 14 is then invoked to generate random numbers. The auditable random number server 14 returns random numbers and optionally input data for signature, digital signature of the data, and identifier of the digital signature server 16. As an option, the client application 12 can also verify the digital signature.

The game element is derived from the random number and some other data elements, such as data elements used for input of random numbers, game specific and other verifiable data elements, pool of possible outcomes, a transformation using statistical distribution with desired outcome and/or a specific algorithm generating game elements depending on random input. The game element or information derived from game element, the digital signature, and digital signature input elements needed for digital signature verification are then logged in a file. In some cases, e.g. for performance optimization, a trigger 26 may be based on multiple events. In this case multiple random numbers corresponding to these events would be generated.

Figure 5:
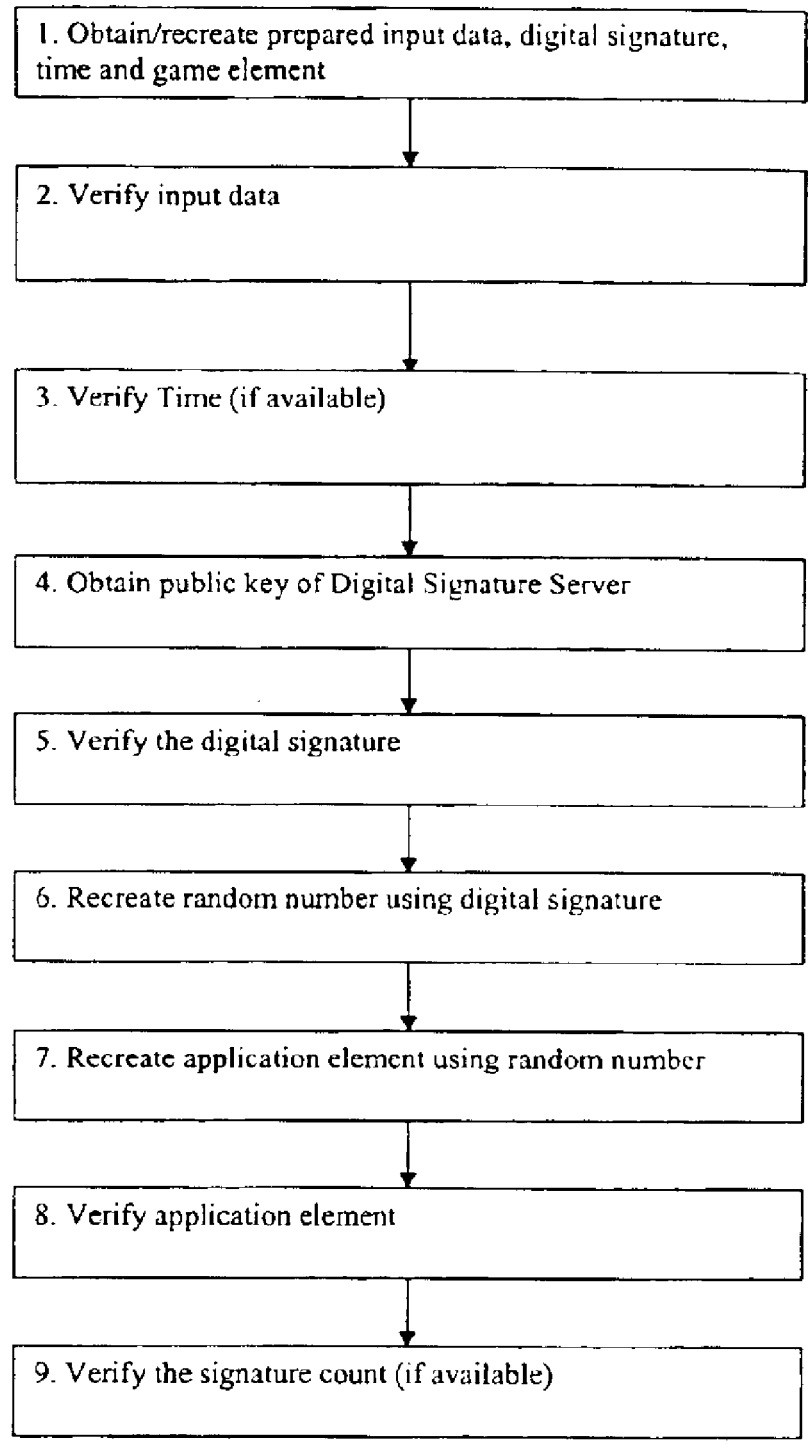
FIG. 5 is a flowchart showing the process of verification of the game elements according to the present invention.

The random numbers are then audited to ensure their integrity by using the verification device 24 shown in FIG. 2. FIG. 5 illustrates the steps of verification of the random numbers by the verification device 24. First, the verification device 24 obtains and recreates the prepared input data, the signed time, the digital signature, and application elements. The input data and the time (if applicable) are verified. The public key from the digital signature server 16 is obtained and then verified. The random number or multiple random numbers are recreated using the digital signature. The application elements are then, in turn recreated using the digital signature. The application elements and signature count (if available) are then verified. It should be understood that order of these steps may be modified to suit the particular environment and game play at hand.

It would be appreciated by those skilled in the art that various changes and modifications can be made to the illustrated embodiments without departing from the spirit of the present invention. All such modifications and changes are intended to be covered by the appended claims.

What is claimed is:

1. A method of generating a random number, comprising the steps of:
   providing a data element;
   providing a digital signature server requiring a public key and a private key;
   generating a digital signature from the data using the digital signature server and the private key; and
   creating a random number based on the digital signature.

2. The method of claim 1, wherein the data element is encrypted.

3. The method of claim 1, wherein the random number is created using asymmetric encryption.

4. The method of claim 1, further comprising the step of:
   verifying the integrity of the digital signature.

5. The method of claim 1, wherein the digital signature server is a PKIX time stamp server.

6. The method of claim 1, wherein the digital signature server is a plug-in device to a computer.

7. The method of claim 1, wherein the digital signature server is a smart card.

8. The method of claim 1, wherein the digital signature server is a circuit board.

9. The method of claim 1, further comprising the steps of:
   providing a plurality of digital signature servers;
   creating a plurality of digital signatures using the corresponding plurality of digital signature serves.

10. The method at claim 1, further comprising the step of:
    creating at least one supplemental data element to the digital signature by the digital signature server to ensure that the digital signature is unique and all the signatures can be accounted for.

11. The method of claim 1, further comprising the step of:
    logging the generation of the digital signature.

12. The method of claim 1, wherein the step of creating a random number is carried out by executing an algorithmic transformation of the digital signature.

13. The method of claim 12, wherein the algorithmic transformation employs symmetric encryption.

14. The method of claim 12, wherein the algorithmic transformation employs asymmetric encryption.

15. The method of claim 13, wherein elements of the digital signature are employed as source data for encryption data input.

16. The method of claim 14, wherein elements of the digital signature are employed as source data for encryption data input.

17. The method of claim 13, wherein elements of the digital signature are employed as source data for encryption keys.

18. The method of claim 14, wherein elements of the digital signature are employed as source data for encryption keys.

19. The method of claim 1, further comprising the step of:

creating output data elements for use by an application.

20. The method of claim 19, further comprising the steps of:

storing input data elements of the digital signature;

storing the digital signature; and storing output data elements.

21. The method of claim 9, further comprising the steps of:

providing at least one client application;

supplying source data from the at least one client application;

creating at least one digital signature; and generating a plurality of random numbers.

22. The method of claim 9, further comprising the steps of:

providing at least one client application;

providing at least one auditable random number server;

supplying source data from the at least one client application to the at least one auditable random number server;

creating source data by the auditable random number server;

inputting the source data into the at least one digital signature server;

creating at least one digital signature; and generating a plurality of random numbers based on the at least one digital signature.

23. The method of claim 21, further comprising the step of:

accessing the client application.

24. The method of claim 22, further comprising the step of:

verifying that a subsequent input to the auditable random number server is an element of a previous output at the auditable random number server.

25. The method of claim 22, wherein the at least one client application is embodied in software.

26. The method of claim 22, wherein the at least one client application is embodied in hardware.

27. The method of claim 1, further comprising the step of:

creating draw data elements from the random number.

28. The method of claim 27, further comprising the step of:

using the draw data elements for a game selected from the group consisting of keno, lotto, bingo, and other games of chance.

29. The method of claim 1, further comprising the step of:

creating play data elements from the random number.

30. The method of claim 29, further comprising the step of:

using the play data elements for a game selected from the group consisting of on-line lottery, video lottery, games of chance on mobile phones, games of chance on personal digital assistants, casino gambling machines, games of chance on home entertainment centers, and instant play games.

31. The method of claim 30, further comprising the step of:

playing the game via the Internet.

32. The method of claim 29, further comprising the step of:

creating casino game elements from the random number.

33. The method of claim 29, further comprising the step of:

creating card distribution elements from the random number.

34. The method of claim 29, further comprising the step of:

creating dice game elements from the random number.

35. The method of claim 29, further comprising the step of:

creating spinning wheel game elements from the random number.

36. The method of claim 29, further comprising the step of:

creating racing wheel game elements from the random number.

37. The method of claim 29, further comprising the step of:

creating competition game elements from the random number.

38. The method of claim 29, further comprising the step of:

creating lottery game elements from the random number.

39. The method of claim 29, further comprising the step of:

creating lottery game promotional elements from the random number.

40. The method of claim 29, further comprising the step of:

creating casino game promotional elements from the random number.

41. A method of generating a random number, comprising the steps of:

providing a client application;

inputting data into the client application;

creating data input elements;

providing an auditable random number server;

inputting the data input elements into the auditable random number server;

preparing the data input elements for signing;

providing a digital signature server; inputting the data input elements into the digital signature server;

creating a digital signature of the data input elements using a private key;

sending the digital signature to the auditable random number server; and creating auditable random numbers using the digital signature.

42. The method of claim 41, further comprising the step of:

logging the random numbers, data input elements and digital signature by the random number server.

43. The method of claim 41, further comprising the step of:

sending the auditable random numbers to the client application.

44. The method of claim 41, further comprising the step of:

sanding the data input elements and digital signature to the client application.

45. The method of claim 44, further comprising the step of:

logging the data input elements and digital signature by the random number server.

46. The method of claim 44, further comprising the step of:

verifying the digital signature.

47. The method of claim 41, further comprising the step of:

logging the random numbers by the client application.

48. The method of claim 41, further comprising the step of:

generating application elements using the random numbers.

49. The method of claim 41, further comprising the step of:

logging the data input elements, digital signature and client application elements by the client application.

50. The method of claim 41, further comprising the step of:

generating draw data elements from the random numbers.

51. The method of claim 41, further comprising the step of:

generating play data elements from the random numbers.

52. The method of verifying the auditable random numbers comprising the steps of:

providing an input data for the digital signature;

providing a digital signature generated during a process of generating auditable random numbers to be verified;

providing a digital signature public key;

providing a method of generation of random numbers from the digital signature;

verifying the digital signature using the public key and provided input data;

recreating the auditable random numbers; and comparing the recreated random numbers with the random numbers to be verified.

53. The method of claim 52, further comprising the step of:

providing a transformation mechanism and data needed to convert random numbers into game elements.

54. The method of claim 53, further comprising:

logging the game elements; and comparing the game elements with the logged game elements.

55. The method of claim 53, wherein the verification system is off-line.

56. The method of claim 53, wherein the verification system is connected on-line to the gaming system.

57. The method of claim 53, wherein the verification system is provided as a service on the Internet.

58. The method of claim 53, further comprising the step of:

providing an accounting of supplemental data elements for each previously signed information.

59. The method of claim 1 wherein the step of generating a digital signature from the data element uses short cryptographic keys for signing of game data elements to achieve high performance.

\* \* \* \* \*